C. Jillson.

Wire-Pointing Mach.

No. 3,475. Reissued Jun. 1, 1869.

Witnesses:
Thos. H. Dodge
Geo. H. Miller.

Inventor:
C. Jillson.

N. PETERS, PHOTO-LITHOGRAPHER, WASHINGTON, D. C.

United States Patent Office.

C. JILLSON, OF WORCESTER, MASSACHUSETTS.

*Letters Patent No.* 18,205, *dated September* 15, 1857; *reissue No.* 3,475, *dated June* 1, 1869.

DIVISION A.

IMPROVED MACHINE FOR MAKING TAPERED WIRE-BLANKS.

The Schedule referred to in these Letters Patent and making part of the same.

*Know all men by these presents:*

That I, C. JILLSON, of the city and county of Worcester, and Commonwealth of Massachusetts, have invented certain new and useful Improvements in Machines for Turning and Pointing Wire; and I do hereby declare the following to be a full, clear, and exact description of the same, reference being had to the accompanying drawing, forming part of this specification, and in which–

Figure 1:
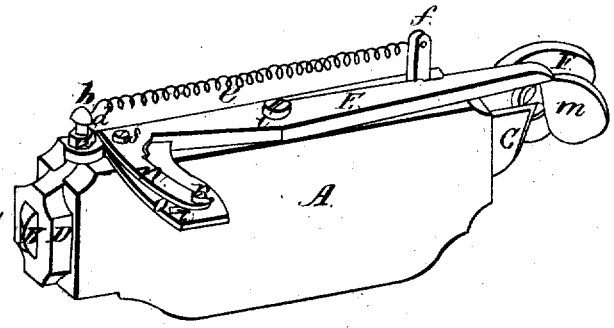
Figure 1 represents a perspective view of so much of the machine as is necessary to illustrate my present improvements.

To enable those skilled in the art to which my invention belongs, to make and use the same, I will describe it more in detail.

The nature of my invention, which forms the subject-matter of this division of reissue, relates to an improved machine for turning and pointing wires, in which the wire is pointed from the point to the body thereof, while the end of the blank to be pointed is supported in a central position by means of an eye or rest, which precedes the cutting-tool, thereby leaving the free end of the blank to be acted upon by the cutter, which is modified in its movement by a pattern.

Pieces of wire, as pointed or tapered heretofore, for pins or other similar articles, have been dressed or tapered from the body to the point, while by my improved machine they are cut or turned from the point to the body, thus reversing the general operation.

In the drawings—

Figure 2:
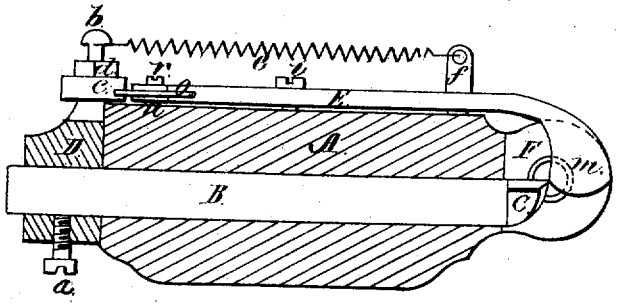
Figure 2 represents a longitudinal vertical section through the parts or machine shown in fig. 1.
Figure 3:
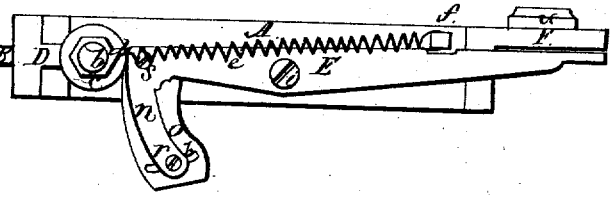
Figure 3 represents a top or plan view of the parts in one position.

A represents a case or stock, through a square mortise in which passes the shank B of the cutting-tool C, which protrudes or projects therefrom, as seen in figs. 1 and 2.

This shank B is made to fit snugly in the mortise in the case, but not so tight but that it can be moved in the mortise to draw the cutter C from the wire that is being pointed, or allow it to approach the same after having been so drawn from it.

On the part of the shank B which projects from the case A, is fitted a piece, D, which is held to the shank by a set-screw, *a*, or otherwise, and in the top of this piece D there is a pin or standard, *b*, upon which is placed a friction-roll, *c*, which is held in place by a nut, *d*.

One end of a coiled spring, *e*, is fastened to the pin or standard *b*, while the other end of said spring is connected to the stud *f*, which projects up from the case A.

The spring *e* is for drawing back the cutter after it has been forced into the case or stock A, and for holding it out, while the piece D serves to regulate the distance or extent to which the cutter can project from said case or stock.

On top of the stock or case A is pivoted, at *i*, a lever or pattern-frame, E, the forward end of which is bent downward and flattened out, (as seen at *m*, figs. 1 and 2,) and the rear end of said lever or frame has an arm, *n*, upon it, which may be slotted, so as to receive a pattern or plate, *o*, which designates or governs the form of the point or taper to be made.

This pattern or plate has a slot, 2, in one of its ends, through which and through the arm *n* passes a set-screw, *r*, the other end of said pattern or plate *o* being held in place by the pivot or screw *s*, whereby said pattern can be adjusted and held close up against the friction-roll *c*.

In a projecting-piece, F, of the case or stock A, is screwed an eye or rest, *v*, the opening in which should be of the diameter of the piece of wire to be pointed or turned, and this eye should be removable, so as to make the machine capable of pointing wires of different sizes, the shape of the point being determined by the pattern or plate *o*, heretofore described.

The instrument or machine above described should or may be fastened to the "dead-spindle" of a lathe, in such a manner as to have the centre of the hole in the eye or rest *v*, and the point of the cutter, when projected out to its full extent, exactly in line with the centre of the "live-spindle," in the head of the lathe.

One end of the piece of wire to be pointed is then fastened in the end of the "live spindle," in any suitable manner, and said spindle set in motion, thereby giving to said piece of wire a rotary motion upon an axis in line with the point of cutter C and the centre of the hole in the eye or rest *v*.

The spindle to which the pointing-instrument or machine is fastened or secured is now pressed toward the head-piece of the lathe, whereby the eye or rest *v* is forced over the end of the piece of wire to be pointed, which should fill the hole in said eye or rest.

The end of the wire, as it passes through the eye or rest, is turned or cut to a point by the cutter, which fits close up to the back of the rest, as shown in the drawings.

Figure 4:
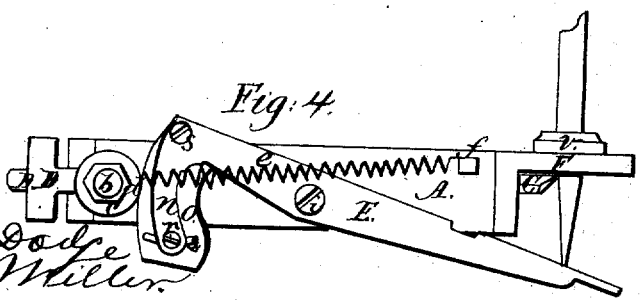
Figure 4 represents a top or plan view of the parts as they appear during the operation of turning the point or taper upon the end of a piece of wire.

As the dead spindle is moved in, thereby causing the rest or eye to precede the cutting-tool, for supporting in a central position the unturned or untapered part of the blank, as it is approached by the cutting-tool; the point of the wire, in this instance, as it passes the cutter, presses against the flat part *m* of the lever or pattern-frame F, and forces it away from the cutting-tool, or rather, prevents that end from moving forward with the rest of the cutting, pointing, or tapering-apparatus, thereby causing said pattern-frame to turn on its pivot *i*, thus bringing the edge of the plate or pattern *o*, against the friction-roll *c*, on the stud *b*, which forces said roll back against the action of the spring *e*, and as stud *b* is fastened to the shank B of the cutter, it forces said shank backward, thus drawing the cutter gradually away from the wire, thereby turning, tapering, or pointing the end of the wire, as shown in fig. 4 of the drawings.

It will be noticed that the action of the cam or pattern modifies or regulates the taper of the point.

The edge of the plate or pattern *o*, shown in contact with the friction-roll, having a regular outline, modifies or regulates the motion of the cutting-tool, so that a regular taper is formed, as above described, while the other or opposite edge of the pattern being irregular, would so modify, control, or regulate the motion of the cutter that an irregular form would be turned, as shown in red lines to the right of fig. 4, of the drawings, and said plate or pattern may be turned over for that purpose; besides, by turning the pattern or plate *o* on its pivot *s*, and then securing it in such adjustable position, the length of taper may be changed as desired.

Thus, it will be seen, that by this machine, different-sized wires may be turned and tapered, different tapers may be given, and different forms may be produced, and that, too, while the end of the wire turned is always on a line with the centre of the blank.

Although the operation of pointing wire is a very delicate one, so much so that it is almost, if not quite, impossible to dress them accurately by the old modes of grinding or dressing, from the body to the joint, by my improved machine they are produced very rapidly and at the same time very perfect and uniform.

By reference to the drawing in red lines, it will be seen that a tapered shoulder may be formed at some distance from the end of the blank, while such end may be turned in any desired tapering form, or with parallel sides.

A tapered shoulder may also be formed by commencing on the outer surface of the blank, and running toward the centre thereof. In this instance, the end of the wire would be projected through the eye or rest, some distance beyond the cutter, before the tapering-operation would commence.

Having described my improved machine for turning and pointing wires.

What I claim therein as new, and of my invention, and desire to secure by Letters Patent, is—

1. The improved pattern-plate *o*, swivelled at one end to the frame E, and slotted transversely at the other, to admit of different adjustments, as set forth.

2 The combination of a series of rests *v*, with the socket or projecting support F, and cutting-tool, substantially in the manner and for the purposes described.

3. The combination of the rest, *v*, yielding gauge *m*, and retreating knife C, all arranged and operating together, substantially as specified.

4. The construction and arrangement, substantially in the manner described, of mechanism for simultaneously gauging the blank and retiring the knife.

5. The arrangement of the reciprocating cutter C, projecting or supporting socket-piece F, and rest *v*, substantially as and for the purposes specified.

C. JILLSON.

Witnesses:
THOS. H. DODGE,
GEO. H. MILLER.